United States Patent [19]

Berger et al.

[11] Patent Number: 5,378,418
[45] Date of Patent: Jan. 3, 1995

[54] METHOD OF MAKING ARTICLES OF EDIBLE OR EASILY BIODEGRADABLE MATERIAL

[76] Inventors: Erhard Berger, Sudstrasse 8, 3110 Munsingen, Switzerland; Ernst Haussener, Dorfstrasse 35, 3073 Gumligen, Switzerland

[21] Appl. No.: 947,528

[22] Filed: Sep. 21, 1992

[30] Foreign Application Priority Data

Sep. 24, 1991 [EP] European Pat. Off. ......... 91810746.7

[51] Int. Cl.6 ............................ A23J 1/02; B29C 45/00
[52] U.S. Cl. .................................. 264/83; 264/328.17; 426/140; 426/657
[58] Field of Search ....................... 264/83, 176.1, 190, 264/202, 328.17; 426/62, 138, 140, 657

[56] References Cited

U.S. PATENT DOCUMENTS

| | | | |
|---|---|---|---|
| 3,620,775 | 11/1971 | Cohly et al. | 264/202 |
| 3,819,610 | 6/1974 | Akin | 264/202 |
| 4,076,846 | 2/1978 | Nakatsuka et al. | |
| 4,125,635 | 11/1978 | De Ruyter | 264/202 |
| 4,476,072 | 10/1984 | Ariëns | 264/202 |
| 4,681,758 | 7/1987 | Fruthaler et al. | 426/62 |
| 4,749,583 | 6/1988 | Branch | 426/138 |

FOREIGN PATENT DOCUMENTS

| | | | |
|---|---|---|---|
| 2508026 | 9/1976 | Germany . | |
| 2720087 | 11/1977 | Germany | 264/83 |
| 2634620 | 2/1978 | Germany . | |
| 2738403 | 3/1979 | Germany . | |
| 3044590 | 6/1982 | Germany . | |
| 2132206 | 7/1984 | United Kingdom | 264/202 |
| 2179589 | 3/1987 | United Kingdom . | |

OTHER PUBLICATIONS

Patent Abstracts of Japan, vol. 8, No. 150 (C-233)(1587), Jul. 12, 1984, & JP-A-59 055 171, Mar. 30, 1984, Shigeji Tagata, "Edible Container Using Fish Plate".

*Primary Examiner*—Leo B. Tentoni
*Attorney, Agent, or Firm*—Oblon, Spivak, McClelland, Maier, & Neustadt

[57] ABSTRACT

The articles are made by mixing an animal protein product of meat, from which the fat has been removed by extraction with a gas in liquid or overcritical state, and starchy grain or vegetable material, plus other additives if necessary, into a mixture of semifluid to pasty consistency. The mixture obtained is extruded, with the addition of water, to form a substantially plastically workable material which is put into the desired shape by means of injection molding. The method may be used for making articles such as disposable tableware and cutlery for households and the catering trade, packaging, or casings.

27 Claims, No Drawings

METHOD OF MAKING ARTICLES OF EDIBLE OR EASILY BIODEGRADABLE MATERIAL

This invention relates to a method of making articles of edible or easily biodegradable material. Such articles may be nonreturnable containers or disposable tableware for household, catering, or restaurant use.

With the worldwide increase in the accumulation household waste, the disposal of plastic items which do not decompose well becomes more and more of a problem to which an ecologically acceptable, i.e., non-polluting solution must be found. The increasingly popular fast-food restaurants are coming in for growing criticism because of their use of disposable tableware made of plastics, such as styrene, and the voluminous production of waste resulting therefrom. For a number of years now, efforts have been undertaken to provide materials which can be produced non-polluting, and the disposal of which does not lead to problems such as contamination of air or water. Until now, no such materials have been able to achieve a breakthrough in practice.

U.S. Pat. No. 4,777,058 describes a method of producing animal food wherein animal protein and starchy serve as the starting material and undergo extrusion. The result is a product having a crisp exterior which can filled during manufacture with deformable contented. However, ever, the specification makes no reference to any suitability of the extrudate for producing a material which can be utilized for molding articles having good mechanical properties.

U.S. Pat. No. 4,076,846 discloses an edible, water-soluble thermoplastic composition suitable for molding articles. It can be put into a suitable shape by means of an extruder. Organic plasticizers, e.g., from the group of multivalent alcohols of low molecular weight, and lubricants, e.g., from the group of the esters of hitcher fatty acids and phosphoric derivates thereof or lecithin, are necessary additives.

It has now been found that such edible articles can be made without the aforementioned additives by using a mixture containing animal protein, such as connective tissue protein consisting of meat from which the fat has been removed by extraction with a gas in liquid or overcritical state, and starchy grain or vegetable material.

It is an object of this invention to provide a method of producing articles such as disposable tableware and the like that can be carried out non-pollutingly and inexpensively.

A further object of this invention is to provide such a method that yields products which have good mechanical properties and are easily biodegradable (compostable) or even edible, or which can be used together with leftovers as food for animals.

To this end, in the method according to the present invention, an animal protein product is produced in that the fat is removed from meat material by means of a gas in liquid or overcritical state, thereafter a blend containing the animal protein product obtained and starchy grain or vegetable material is produced in the form of a mixture of semifluid to pasty consistency, the mixture is extruded with the addition of water to form a plastically workable material, and the material obtained is molded into articles by injection molding.

As regards the animal protein product, the articles obtainable by the inventive method may be made from raw materials such as accumulate in slaughterhouses. Inasmuch as not all meat products are equally popular with exacting consumers, the inventive method proposes a meaningful utilization for the less appreciated products as well. This animal protein product may, for example, be obtained by means of processes such as are described in U.S. Pat. No. 4,280,691 or European Patent Application Publication No. 0 052 078. These specifications describe processes for extracting meat products by means of gases in overcritical state. The gas preferably used is carbon dioxide, although the extraction can also be carried out with other gases, such as nitrous oxide, ethane, ethylene, fluorinated hydrocarbons, etc. Extraction takes place statically, e.g., in an autoclave, the duration being from 10 to 120 minutes. Depending on the material to be extracted, it can be subjected to an additional treatment prior to extraction, e.g., mincing and/or mixing with structurizing foodstuffs. The purpose of these processes is primarily to produce pure, solvent-free animal fats, the residues being solvent-free connective tissue protein products which have heretofore usually been processed into animal food, but also into other products such as sausages. The method of the present invention now represents a meaningful possibility of processing cuts of meat whose supply exceeds the demand.

For carrying out the inventive method, an animal protein product, a starchy vegetable or grain product, and necessary, seasonings and other food adjuvants, are combined into a mixture in a mixer such as is normally used in the food-processing industry. Examples of starchy ingredients are dried products made of wheat, oats, rye, corn, millet, rice, potatoes, manioc, peas, and beans. If so desired, soyabean flour may also be added to increase the protein content.

The mixture is then extruded to form semifinished products. The consistency of the mixture utilized is semi-fluid to pasty, as a rule, but preferably such that it can be continually fed to the extruder for further processing. This processing is advantageously carried out at a pressure of 2.07 MPa (300 psi) to 5.86 MPa (850 psi). Good results are achieved when a pressure of about 3.85 MPa (550 psi) is applied. If the starting product is too thin, the required pressure cannot be built up in the extruder.

The intermediate products are normally expelled from the extruder in the form of elastic strands. For further processing, they may be used as such or cut into pieces. During the extrusion operation ("cooking extrusion"), temperatures of up to 300° C. may occur. The temperature may easily be regulated through expedient adjustment of the parameters, such as operating pressure and water supply. The pressure of the extruder is preferably adjusted so that temperatures in the range of 180°–200° C. occur. The processed material typically stays in the shaping nozzle of the extrusion head for about eight seconds, during which the temperature rises continuously from 25° C. to 185° C. and is again lowered to about 135° prior to discharge. If necessary, the nozzle at the discharge orifice must be chilled with cooling water. Too high a discharge temperature may lead to bumping (retardation of ebullition) and to an irregular product.

It has unexpectedly been found that despite the high temperatures, the valuable ingredients of the extruded foodstuff do not suffer any damage. This is obviously due to the fact that the mentioned temperatures occur for only a very brief period of from 0.5 to 30 seconds during processing. It may also be noted in this connection that the processed mixture is extremely evenly heated through the application of pressure. Irregularities such as local overheating are thereby avoided. The uniformly high temperature in the region of the nozzle further ensures that any possible germs can be effectively destroyed throughout the mixture.

Relative to its solids content, the mixture utilized for extrusion preferably has the following composition (percentages by weight):

2–40% connective tissue protein
60–90% wheat flour
0–5% table salt
0–10% sugar.

The water content of the mixture may be adjusted, according to the water content already present in the connective tissue protein and the desired consistency, by adjusting the water supply during the extrusion operation. In addition, still other components, such as condiments, flavorings, food coloring, and adjuvants, may be used.

Alternatively, the mixture may contain 20–40% by weight of grain flour and 20–90% by weight of a filler, besides the connective tissue protein. The filler is preferably a product made of plant fibers, e.g., fibers of rice or grain straw, reeds, or wood.

The semifinished product produced by the inventive method is preferably further processed in the form of plastically workable strands. However, chips, pellets, slabs, etc., are also possible. The material may be processed similarly to plastic and can thus be used as a plastic substitute. Depending upon its composition and the processing temperature, products of various degrees of hardness, strength, and moisture-resistance are obtained. A low water content or a higher pressure normally leads to sturdier products.

In the method of the present invention, the material is further processed into articles by means of an injection molding process known per se. Especially preferred is the production of disposable tableware and cutlery for use in the catering trade and in households. However, packaging, casings, and the like may also be injection-molded in this way. Injection-molding installations similar or identical to those widely used for the processing of plastics enter into consideration. During processing, temperatures of from 60°–150° C., preferably about 135° C., are reached.

The two extrusion process steps may also be carried out in succession in a single installation, e.g., by conveying the strand expelled from the extruder directly into a synchronously operating injection-molding apparatus forming part of the installation; or the two process steps may instead be carried out directly in a injection-molding installation, or in such an installation combined with an extruder. As is known from the art of plastics processing, a screw-type extruder may be utilized, for instance.

The following non-limitative examples serve to explain the invention in more detail:

EXAMPLE 1

Dry $CO_2$ at a pressure of up to 150 bars was introduced at 40° C. into an upright, cylindrical autoclave containing 1 kg of a minced, fatty mass of meat deriving from a mechanical deboning apparatus. The meat was extracted in position for 90 min. The contents of the autoclave were then ejected in the form of a strand. The fat extracted was at the bottom of the autoclave, cleanly separated from the extraction residue. Approximately 560 g of extraction residue and 440 g of fat were obtained. The extraction residue consisted predominantly of connective tissue protein having a water content of 57% by weight.

The extracted product was mixed with 800 g of whole wheat flour, using a stirring apparatus, 20 g of table salt being added to the mixture. The mixture was then fed to an extruder, where it was extruded, applying a pressure of 3.50 MPa (500 psi) and with water supplied (app. 10%). The maximum temperature attained was 185° C., to which the mixture was subjected for 2 sec. The plastically workable strands extruded were collected and made available for further processing.

The extruded material was fed into a conventional injection-molding installation and molded into cups by means of a piston pressure of up to 120 tons (temperature up to 135° C.). After drying briefly in the air, the cups became stronger.

EXAMPLE 2–7

The method described in Example 1 was repeated, a twin-screw extruder with a pressure of 3.50 MPa (500 psi) being used for the preliminary mixture, and injection molding taking place with a piston pressure of 100 tons at 170° C.

Alternatively, the mixture was prepared cold in a mixer and, after RF excitation, pressed with a piston pressure of 200 tons at a temperature of 130° C.

The proportions of the mixture are shown in the following table, the figures representing percentages by weight:

|  | Example 2 | Example 3 | Example 4 | Example 5 | Example 6 | Example 7 |
|---|---|---|---|---|---|---|
| Protein | 10 | 10 | 10 | 20 | 20 | 20 |
| Straw* | 70 | — | — | 70 | — | — |
| Ramie | — | 70 | — | — | 70 | — |
| Wood | — | — | 70 | — | — | 70 |
| Grain Flour** | 20 | 20 | 20 | 10 | 10 | 10 |

*may be from any sort of grain
**may be from various sorts of grain and in various types of grinding The products obtained in the foregoing Examples 2–7 were substantially analogous to those obtained in Example 1.

What is claimed is:

1. A method of making articles of edible or easily biodegradable material without using either a plasticizer or a lubricant, comprising:

a) producing an animal connective tissue protein product by removing fat from animal connective tissue using carbon dioxide in a liquid or over critical state, b) mixing the animal connective tissue protein product with a starchy grain or vegetable material to form a mixture having a semifluid to pasty consistency, c) extruding the mixture with the addition of water to form a plastic reworkable material, and d) molding the extruded material by injection molding to form said articles.

2. A method of making articles of edible or easily biodegradable material without using either a plasticizer or a lubricant, comprising:

a) producing connective tissue protein by removing fat from animal connective tissue using a gas in a liquid or over critical state, b) forming a mixture, comprising:
i) 2-40% by weight of connective tissue protein,
ii) 60-90% by weight of whole wheat flour,
iii) 0-5% by weight of table salt, and
iv) 0-10% by weight of sugar,
the percentages by weight being relative to the total mass of the solids content,
c) extruding the mixture with the addition of about 10% by weight of water during extrusion to form a plastically workable material, and
d) molding the extruded material by injection molding to form said articles.

3. A method of making articles of edible or easily biodegradable material, without using either a plasticizer or a lubricant, comprising:
a) producing connective tissue protein and removing fat from animal connective tissue using a gas in a liquid or over critical state,
b) forming a mixture, comprising:
i) 8-40% by weight of connective tissue protein,
ii) 2-40% by weight of grain flour,
iii) 20-90% by weight of a plant-fiber-based filler selected from the group consisting of straw, ramie and wood, and
iv) 0-10% by weight of flavoring or colorant substances,
the percentages by weight being relative to the total mass of the solids content,
c) extruding the mixture with the addition of about 10% by weight of water during extrusion to form a plastically workable material, and
d) molding the extruded material by injection molding to form said articles.

4. The method of claim 1, wherein the starchy grain or vegetable material is selected from the group consisting of wheat, oats, rye, corn, millet, rice, potatoes, manioc, peas, and beans, further comprising the step of crushing the starchy grain or vegetable material prior to mixing with the animal protein product.

5. The method of claim 1, further comprising the step of adding to the mixture prior to extrusion up to 5% by weight of salt, relative to the total solids content.

6. The method of claim 1, wherein the extrusion is carried out in such a way that the extruded material is subjected to temperatures of up to 300° C. for from 10 seconds to 2 minutes.

7. The method of claim 6, wherein the temperatures are from 180°-200° C.

8. The method of claim 1, wherein extrusion takes place at a pressure of at least 2.07 MPa (300 psi) to 5.86 MPa (850 psi).

9. The method of claim 8, wherein extrusion takes place at a pressure of about 3.85 MPa (550 psi).

10. The method of claim 1, wherein the steps of extrusion and injection molding are carried out in succession in a single installation.

11. The method of claim 1 carried out directly by means of an injection-molding installation.

12. The method of claim 1 carried out by means of an injection-molding installation combined with an extruder.

13. The method of claim 2, wherein the gas:; is carbon dioxide.

14. The method of claim 2, wherein the extrusion is carried out in such a way that the extruded material is subjected to temperatures of up to 300° C. for from 10 seconds to 2 minutes.

15. The method of claim 14, wherein the temperatures are from 180°-200° C.

16. The method of claim 2, wherein extrusion takes place at a pressure of about 3.85 MPa (550 psi).

17. The method of claim 2, wherein the steps of extrusion and injection molding are carried out in succession in a single installation.

18. The method of claim 2 carried out directly by means of an injection-molding installation.

19. The method of claim 2 carried out by means of an injection-molding installation combined with an extruder.

20. The method of claim 3, wherein the gas is carbon dioxide.

21. The method of claim 3, wherein the extrusion is carried out in such a way that the extruded material is subjected to temperatures of up to 300° C. for from 10 seconds to 2 minutes.

22. The method of claim 21, wherein the temperatures are from 180°-200° C.

23. The method of claim 3, wherein extrusion takes place at a pressure of about 3.85 MPa (550 psi).

24. The method of claim 3, wherein the steps of extrusion and injection molding are carried out in succession in a single installation.

25. The method of claim 3 carried out directly by means of an injection-molding installation.

26. The method of claim 3 carried out by means of an injection-molding installation combined with an extruder.

27. The method of claim 2, which further comprises step b), iv) adding food coloring.

* * * * *